United States Patent [19]

Lund et al.

[11] 4,118,167

[45] Oct. 3, 1978

[54] COEXTRUSION DIE

[75] Inventors: Arnold S. Lund; Thomas L. Stroh, both of Cadillac, Mich.

[73] Assignee: Cadillac Rubber & Plastics, Inc., Cadillac, Mich.

[21] Appl. No.: 652,980

[22] Filed: Jan. 28, 1976

[51] Int. Cl.² .............................................. B29D 23/04
[52] U.S. Cl. ..................................... 425/463; 264/173;
425/133.1; 425/381; 425/382 R; 425/466;
425/467
[58] Field of Search ....................... 425/133.1, 381, 466,
425/382, 463, 464, 462, 467, 468; 264/173, 209

[56] References Cited

U.S. PATENT DOCUMENTS

| 3,365,750 | 1/1968 | Donald | 425/466 X |
| 3,404,432 | 10/1968 | White et al. | 425/133.1 X |
| 3,697,209 | 10/1972 | Schiesser | 425/133.1 |
| 3,752,614 | 8/1973 | Bremer | 425/466 |
| 3,856,448 | 12/1974 | Iijima et al. | 425/133.1 |
| 3,860,372 | 1/1975 | Newman | 425/133.1 |
| 3,948,079 | 4/1976 | Fuchs, Jr. | 425/464 X |

FOREIGN PATENT DOCUMENTS 2,332,518  1/1975  Fed. Rep. of Germany ........ 425/133.1

Primary Examiner—Richard B. Lazarus
Assistant Examiner—Mark Rosenbaum
Attorney, Agent, or Firm—McGarry & Waters

[57] ABSTRACT

A multiple-cavity extrusion die for coextruding a plurality of indefinite lengths of multiple-layer tubular rubbery material. Core mandrels which extend into openings in the face of the die are adjustable for concentricity with respect to the die by internal or special external adjusting means. Cylindrically shaped core dies have frustro conically shaped forward portions which form extrusion dies with the cores for the core layer of rubbery material and form extrusion dies with a beveled back edge of an adjustable cylindrical cover die. Each of the cover dies is axially adjustable with respect to a respective core die to adjust the speed at which the individual tubes are extruded so that the speed of all tubes can be equalized. Special concentricity plates on the face of the covered dies are adjustably mounted with respect thereto so as to adjust the die openings for concentricity of the cover layer of rubbery material of each tube.

19 Claims, 6 Drawing Figures

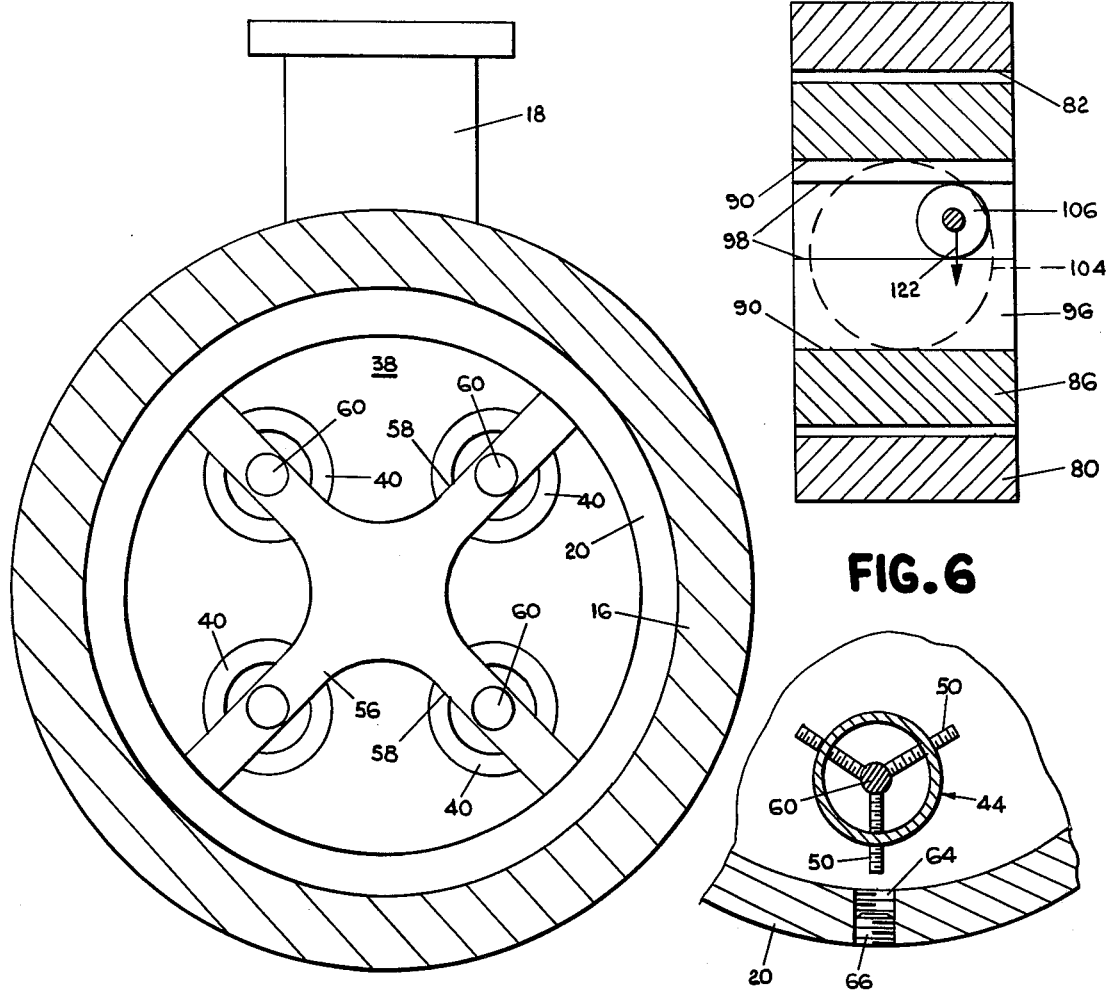
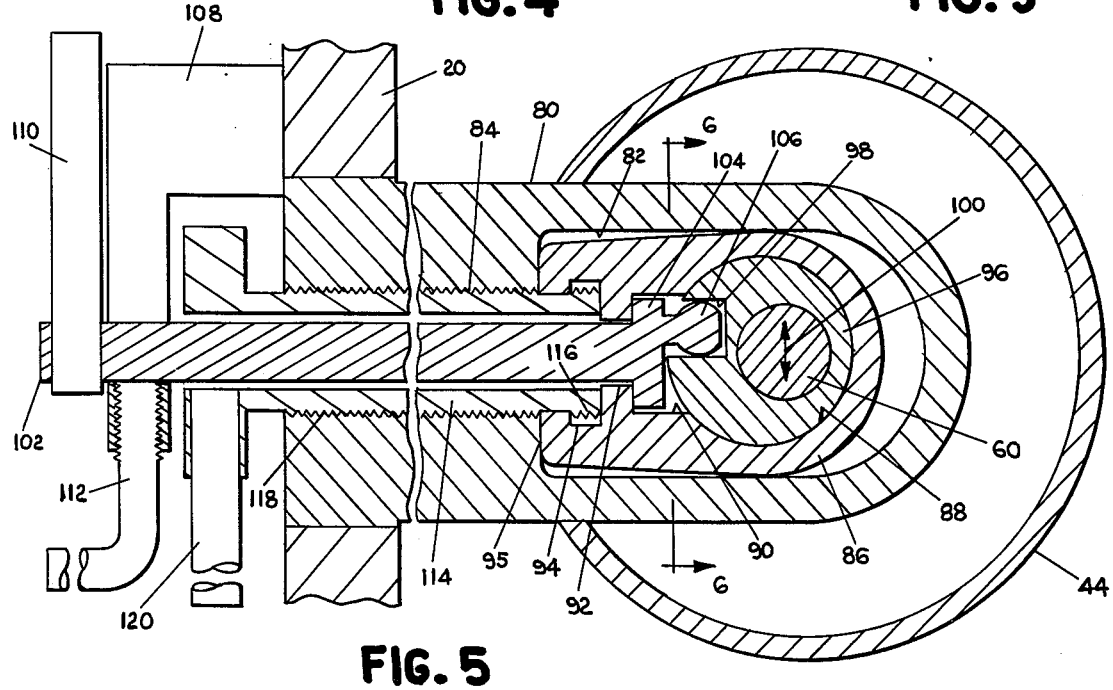

COEXTRUSION DIE

BACKGROUND OF THE INVENTION

1. Field of the Invention

This invention relates to extrusion dies for vulcanizable rubbery materials. In one of its aspects, the invention relates to a multiple-cavity extrusion die for simultaneously coextruding a plurality of multiple-layer tubular members at equal rates. In another of its aspects, the invention relates to a multiple-cavity extrusion die for extruding multiple-layer tubes wherein at least some of the dies are adjustable for concentricity of the core and cover layers independently of each other. In still another of its aspects, the invention relates to a novel die structure for coextruding one or more multiple-layer tubes of vulcanizable rubbery material.

2. State of the Prior Art

Rubber tubing for many industrial applications requires that the material be resistant and impervious to certain organic solvents and gasoline. Many materials such as polymers of ethylene, propylene diene monimers and neoprene are suitable for such uses. However, these rubbery materials are expensive and not always available in large quantities. It has thus been popular to make rubber tubing in two adhesively secured concentric layers. The inner or core layer is thinner and made of a higher priced barrier material. The outer or cover layer is thicker and made of a less expensive, perhaps more durable, and more readily available material such as butyl rubber or GRS.

Heretofore such composite tubes have been made in a two-step process. First, the core layer was extruded to a desired thickness. The extruded core tube was then drawn through a cross-head die and the cover layer was extruded on top of the core tube. This process is rather expensive in that it requires a dual line of equipment and is considerably more time consuming than necessary. Insofar as presently advised, equipment for simultaneously extruding two concentric tubular layers of rubbery materials has not been heretofore successfully developed.

Devices for coextrusion of tubular shapes with concentric layers are described in the patent literature and are well known in the thermoplastic extrusion art. U.S. Pat. No. 1,637,207, issued July 26, 1927, to Whitehouse, for example, discloses an apparatus for coextruding tubes of rubbery material to form concentric tubes. As is thought necessary in the extrusion art, long land dies are used to extrude the core material and a relatively long tapering extrusion cavity is shown for extrusion of the cover layer.

Long land dies and long extrusion cavities are generally thought necessary for proper working of plastic materials prior to extrusion. Such structures are desirable for thermoplastic materials. However, the long and narrow extrusion cavities have proven to be undesirable for thermosetting materials, such as vulcanizable rubbers. These rubbery materials have a narrow range of extrusion parameters; they set under the influence of temperature and time. Thus, the higher the temperature, the shorter the time in which the materials set. The working of the rubbery materials in the elongated narrow extrusion cavity raises the temperature of the rubbery material significantly and makes temperature control of the rubbery material in the extrusion cavities difficult. Excessive heating of the rubbery material can cause setting of these materials in the dies. It has accordingly been found that the long tapered extrusion cavities, as, for example, disclosed in the Whitehouse patent, are unsuitable for coextrusion of most thermosetting rubbery materials because of the difficulty of controlling the temperature of the rubbery polymer and dwell time of the polymer in the dies.

U.S. Pat. No. 253,822 to Mignon, issued Feb. 14, 1882, discloses the coextrusion of materials to form a candle for electric lighting. The candle has a tubular carbon cover layer and a solid core or plastic material core layer. An extrusion device for manufacturing arc lamp electrodes is also disclosed in U.S. Pat. No. 830,201 to Blondel, issued Sept. 4, 1906. However, neither the Mignon nor the Blondel extrusion apparatus would be suitable for extruding the rubbery material in tubular form because of the long extrusion cavities.

An extrusion die for extruding reinforced plastic or rubber tubing is disclosed in U.S. Pat. to Schiesser, No. 3,697,209, issued Oct. 10, 1972. In the Schiesser die, a rubbery or plastic material is extruded in a first tubular shape on a mandrel and reinforcing material is thereafter fed through the die onto the tubing. Another layer of the same rubbery material is thereafter extruded onto the reinforced core layer. The mandrel is mounted on a pair of eccentric sleeves which are used to adjust the mandrel for concentricity when rotated. An annular disc forms the outer surface of the reinforced tubing and is mounted in a holder through a series of set screws which can be adjusted for centering the outer tubing with respect to the central mandrel. The Schiesser die is not adopted to extrude two different rubbery materials.

The extrusion of small composite tubing from a single die head would be significantly more economical if multiple tubes could be extruded simultaneously from the same die head. However, multiple die head extrusion processes frequently cause problems in that the tubing is not extruded at the same rates and the concentricity of the tubing varies depending on the relative position of the die opening with respect to the feed system.

SUMMARY OF THE INVENTION

According to the invention, a multiple-cavity extrusion die for simultaneously coextruding a plurality of tubular lengths of rubbery material has a housing including a front face defining a common extrusion cavity. The front face has a plurality of openings. Means define a core mandrel extending at least into the openings in the front face of the housing. A first extrusion means within the housing is provided for extruding a first rubbery material onto each of the core mandrels to form a tubular shape of such material. A second extrusion means within the housing is provided for extruding a second rubbery material onto each of the tubular shapes formed by extrusion of the first rubbery material to provide a tubular cover for each of the tubular shapes. Means are provided for adjusting the speed of extrusion of each of the composite tubular shapes independent of each other and without significantly affecting the thicknesses of the cover and core layers so that each tubular shape is extruded at a uniform rate despite the pressure of the second rubbery material at the respective second extrusion means.

The second extrusion means comprises a tubular cover die positioned within each of the openings in the front face, each of the cover dies having an inner annular edge, preferably beveled at an angle of 30° to 80° with respect to the axis thereof, the beveled edge forming a part of the annular extrusion die opening for the second extrusion means. Cover dies are mounted within the face plate openings for adjustable axial movement to provide the speed adjusting means for the tubular shapes. In a preferred embodiment of the invention, the beveled edge on the cover dies is about 45° with respect to the axis thereof.

The second extrusion means further includes a plurality of core dies, each having a conical outer surface whose angle with respect to the axis thereof is complementary to the angle of the beveled edge of the cover dies. The outer surface of the core dies form the opposing portion of the extrusion die for the second rubbery material with the beveled edges of the cover dies.

In order to compensate for different pressures at the different die openings, means are provided for adjusting the shape of the cover layer of at least some of the tubular shapes for concentricity as the tubular shapes are extruded. The concentricity adjustable means includes an annular plate mounted on at least some of the cover dies for facial adjustment with respect to the cover dies.

The pressure of the rubbery material within the die housing creates different pressures on the core mandrel and thus tends to distort some mandrels more than others. Accordingly, means are provided for adjusting at least some of the core mandrels for concentricity with respect to the cover dies. In one embodiment, the mandrel concentricity adjustable means comprises a plurality of pins which are threaded through the core dies. In another of its aspects, the mandrel concentricity adjustable means extend perpendicular to the core mandrel and extend through the housing for adjusting the concentricity of the core mandrel with respect to the cover dies and face plate openings. In this embodiment, the core mandrel adjusting means includes a cylindrical adjustable wheel which eccentrically mounts a core mandrel within the core die. Means rotatably mount the adjusting wheel in an adjusting shank and the adjusting shank is radially mounted with respect to the housing. Means extending to the outside of the housing are provided for rotating the adjusting wheel with respect to the adjusting shank independent of the adjusting shank. Means are further provided for radially adjusting the adjustable shank with respect to the housing.

BRIEF DESCRIPTION OF THE DRAWINGS

The invention will now be described with reference to the accompanying drawings in which:

FIG. 3 is a partial sectional view along lines 3—3 of FIG. 2;

FIG. 4 is an elevational view of a back end of the die and seen along lines 4—4 of FIG. 2;

FIG. 5 is a view like FIG. 3 illustrating a second embodiment of the invention; and FIG. 6 is a partial sectional view taken along lines 6—6 of FIG. 5.

DESCRIPTION OF THE PREFERRED EMBODIMENTS

Figure 2:
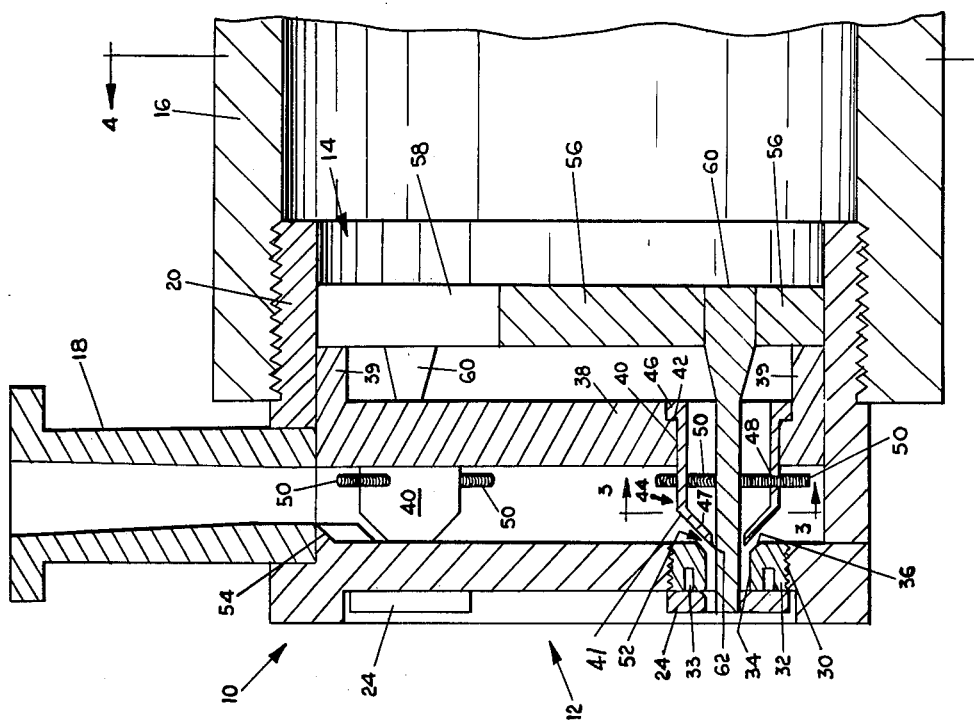
FIG. 2 is a side view of the multiple-cavity die seen along lines 2—2 of FIG. 1.
Figure 1:
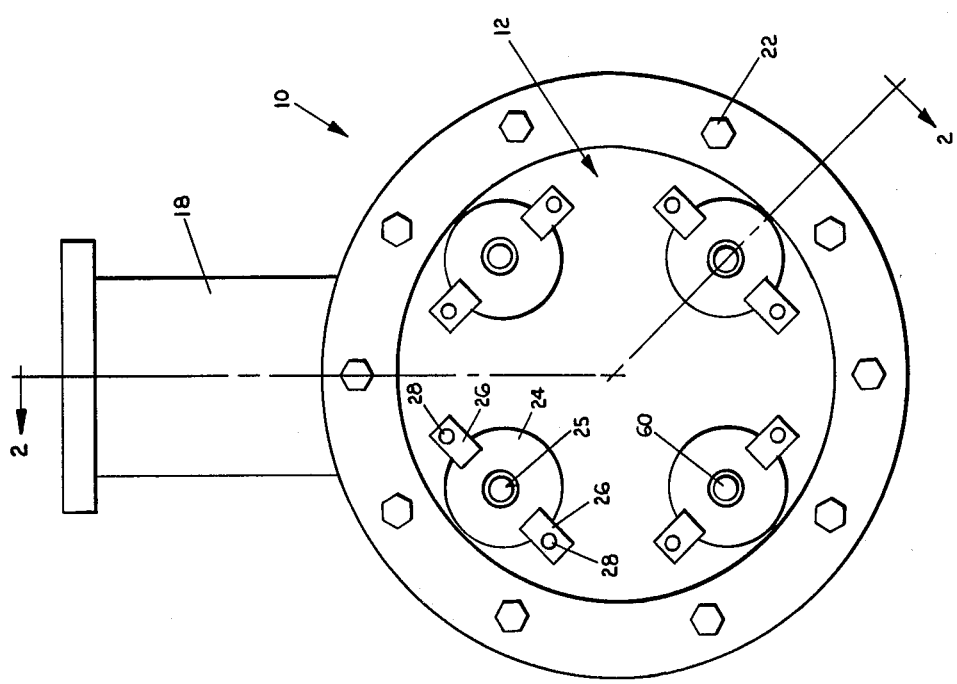
FIG. 1 is a front elevational view of a multiple-cavity die according to the invention.

Referring now to the drawings and to FIGS. 1 and 2 in particular, there is shown a multiple cavity coextrusion die 10 comprising a face plate 12 and a cylindrical hollow body 20. A core extrusion press 16 is secured to a back end 14 of the die. A side conduit 18 extends into the interior of the extrusion die and is adapted to be connected to another extrusion press (not shown) for supplying rubbery material to form the cover or outer layer of the tubular products extruded by the die. The face plate 12 is secured to the cylindrical hollow body 20 through a plurality of machine bolts 22 in conventional fashion.

A plurality of concentricity adjustable die plates 24 having central openings 25 are adjustably secured to the face plate 12 through pressure plates 26. Machine bolts 28 extend through the pressure plates 26 and are threaded into the face plates 12 to adjustably secure the pressure plates 26 to the face plates 12.

The face plate 12 has a plurality of threaded openings 30 into which are threadably secured an adjustable speed control die 32. A central bore 34 extends through the speed control die 32 and a radial chamfer 36 is provided at the inner edge of the bore 34. The speed control dies 32 contain axial holes 33 or other tool gripping means so that the dies 32 may be axially adjusted by rotation within the threaded openings 30.

A core plate 38 is securely mounted within the cylindrical hollow body 20. A plurality of openings 40 with shoulders 42 are provided in the core plate 38. An axial annular shoulder 39 of core plate 38 extends rearwardly along the inside surface of the hollow body 20. A hollow core die 44 is positioned within each opening 40 in the core plate 38. Each core die 44 has a rear shoulder 46 which abuts a shoulder 42 in the core plate 38. At the forward end, the core dies 44 have tapered lands 47 which complement the radial chamfers 36 of the speed control die 32 to form an annular cover extrusion means 52. Three or more threaded radial openings 48 are provided in the core die 44 and threaded set screws 50 are threaded into the threaded openings 48. As illustrated in FIG. 3, the three threaded set screws 50 are arranged at 120° from each other about the core die 44. If desirable, four equally spaced set screws can be used in lieu of the three set screws illustrated.

As illustrated in FIG. 3, a threaded opening 64 is provided in the cylindrical hollow body 20 adjacent to one of the set screws 50. A threaded plug 66 is provided in the threaded opening 64. The plug 66 can be removed for direct access to the adjacent set screw 50 when adjusting the location of the core 60.

As seen in FIG. 2, the front face plate 12 has a chamfer 54 at an upper edge thereof at the connection with the side conduit 18 to facilitate flow of the rubber material into the flow path defined by the front face plate 12 and the core plate 38. If desired, partial shields (not shown) can be placed above the top cover dies to minimize pressure differentials at the top and bottom cover extrusion orifices.

As seen in FIGS. 2 and 4, a four-prong web 56 is positioned within the cylindrical hollow body 20 in abutting relationship with the annular shoulder 39 of the core plate 38. The web 56 thus forms openings 58 at the back of the die through which openings rubbery material can pass. A plurality of cores 60 are securely mounted in the webs 56 and extend through the interior of the core die 44, through the central bore 34 of the speed control die 32 and through the central openings 25 in the adjustable die plates 24. The leading edge of each core 60 preferably is substantially coextensive with the front face of the adjustable die plates 24. However, the leading edge of the core 60 can extend further forward than the front face of the die plate 24 or can be slightly recessed within opening 25, if desired.

As illustrated in FIG. 2, each core 60 forms with the leading edge of the core die 44 an annular core layer extrusion means 62. The leading edge of the core die 44 is machined to be parallel with the core 60 at the annular extrusion means 62 so that a very short extrusion die is formed therebetween. As seen in FIG. 2, the outer diameter of the extrusion means 62 is considerably smaller than the outer diameter of the central bore 34 of die 32. In a similar manner, the radial chamfer 36 of the speed control die 32 is machined so as to be parallel to the tapered lands 47 of the core die 44 at the cover extrusion means 52. The extrusion annulus for the cover and the extrusion annulus for the core are thus seen to be extremely short, although effective, for extrusion of the rubbery product with a minimum of back pressure and a minimum of frictional resistance. Further, the cover extrusion means 52 and the core extrusion means 62 are adjacent to each other so that the cover layer is extruded onto the core layer as the core layer is formed. These short lands are highly desirable in the coextrusion of rubber so as to avoid "setting up" or hardening of the rubber during the extrusion process. The angle of the tapered lands 47 of the core dies is preferably about 45° with respect to the axis of the core dies although this angle can vary between 30° and 80°.

In operation, a first rubbery material for the core of the tubes is expressed by the die 16 through the openings 58 and into the interior of the core die 44. The rubber then passes through the annular core layer extrusion means 62 on the core 60 to form a relatively thin core layer of a tube. A second rubbery material is expressed from a die (not shown) into a side conduit 18 and passes into the core area between the core plate 38 and the face plate 12. The core rubbery material thus passes around the core dies 44 and is expressed through the short annular cover extrusion means 52 and is deposited onto the core layer of rubbery material. Normally, the cover material will be the thicker layer and will be less expensive than the core material. The speed at which the cover material is fed through the extrusion means 52 determines the speed at which the tubes are extruded from the die because the cover layer is relatively thicker than the core layer. During the extrusion process, the cover rubbery material adheres to the core rubbery material and forms an integral unit after vulcanization.

The speed at which the tubes are extruded from each of the die cavities can be individually adjusted. Such speed adjustment takes place by screwing the speed control dies inwardly or outwardly depending on the type of adjustment desired. Screwing the plates 32 in farther will reduce the speed at which the tubes are extruded and screwing the plates outwardly results in an increase in speed at which the tubes are extruded. In order to make the adjustment, the adjustable die plates 24 need to be removed. A tool extends into the holes 33 for gripping the die plate 32 for this adjustment. Because the thickness of the core layer is determined by the diameter of the core layer extrusion means 62, the adjustment of the die plate 32 does not materially affect the thicknesses of the core and cover layers.

The pressure of the cover rubbery material as it flows through the die plate exerts a downward pressure (as viewed in FIG. 2) on the cores 60. This downward pressure will vary between the cores in the top and the bottom die cavities. In order to adjust for the differences in such pressure at the core layer extrusion annulus, the threaded set screws 50 are provided. By a trial and error method, the set screws are moved to adjust the core 60 with respect to the leading edge of the core die 44.

The adjustment to the cores 60 and the flow forces of the cover rubbery material can cause some eccentricity of the cover material in the tube. In order to adjust for such eccentricity, the die plates 24 are adjusted laterally on the face plate 12.

Reference is now made to FIGS. 5 and 6 for a description of a modified form of the invention. In this embodiment, the cores 60 are adjustable from the outside of the cylindrical hollow body 20. In FIGS. 5 and 6, like numerals have been used to designate like parts. An adjustment device is used for each core 60. For purposes of simplicity, only one such adjustment device will be shown and described although it is to be understood that there normally would be one such adjustment device for each core 60.

The adjustment device comprises an elongated body 80 which is threaded into a threaded opening in the hollow body 20. An elongated opening 82 and a threaded bore 84 extend through the elongated body 80 in directions perpendicular to each other. A movable core piece 86 is slidably mounted within the elongated opening 82. A circular bore 88 and slots 90, 92, 94 and 95 of various widths are machined transversely within the movable core piece 86. A cylindrical wheel 96 having an axial slot 98 is rotatably mounted within the circular bore 88. The core 60 is mounted eccentrically within the cylindrical wheel 96. Thus, rotation of the cylindrical wheel 96 about its central axis moves the core 60 upwardly and downwardly as illustrated by the arrow 100 in FIG. 5.

A vertical adjusting shaft 102 is journaled in bearing slots 92 and has a shoulder 104 which is mounted in the slot 90 of the movable core piece 86. A knob 106 is provided excentrically on the circular shoulder 104 and is fitted into the axial slot 98 in the cylindrical wheel 96. In FIG. 6, the outline of the shoulder 104 is projected into the plane of the drawing to illustrate the relationship between shoulder 104, knob 106 and slot 90. The outline of shoulder 104 is thus illustrated in phantom lines in FIG. 6. At the outer end, the adjusting shaft 102 is journaled in a retaining flange 108 which is secured to the hollow body 20. A set screw 112 is threaded into one end of the flange 108 and bears against the adjusting shaft 102 to prevent rotation thereof as desired.

A hollow horizontal adjusting shank 114 is mounted concentrically about the adjusting shaft 102 and has an external threaded surface 118 which threadably engages a corresponding threaded section of the bore 84 of body 80. The shank 114 has an annular threaded shoulder 116 which threads within the slot 94 of the movable core piece 86. A handle 120 is removably provided on the outer end of the shank 114.

The adjustment device works as follows: rotation of the vertical adjusting shaft 102 in a counterclockwise direction as viewed in FIG. 6 will move the knob 106 in the direction of the arrow 122 in FIG. 6. As a result thereof, the cylindrical wheel 96 will rotate in a counterclockwise direction as viewed in FIG. 5, thereby moving the core 60 upwardly and slightly to the left about an arc represented by arrow 100. Because of the positioning of the core 60 with respect to the slot 98, the major component of movement of the core 60 will be in an upward direction.

The core is moved laterally or horizontally by rotation of the horizontal adjusting shank 114. Thus, rotation of the shank 114 through handle 120 will cause a lateral sliding movement of the movable core piece 86, resulting in a lateral shifting of the core 60. All adjustments of the core can be accomplished externally of the die. Thus the concentricity adjustments can be made while the extrusion is being carried out.

The invention provides a die through which multiple tubes can be simultaneously extruded. Although four die openings or die cavities have been shown with respect to FIGS. 1 through 4, the invention can provide for 2, 3, 5 or more die openings or cavities as well. The die provides a system whereby the core can be adjusted for concentricity of the core material and can also be adjusted for concentricity of the cover material. Further, with the invention, the number of extrusion openings can be changed. The core parts can be interchanged to provide for one or more die cavities or die openings.

Reasonable variation and modification are possible within the scope of the foregoing disclosure, the drawings and the appended claims without departing from the spirit of the invention.

We claim:

1. A multiple-cavity extrusion die for simultaneously coextruding a plurality of tubular lengths of rubbery material, said extrusion die comprising:
   a housing defining a common extrusion cavity, said housing including a front face defining a plurality of separate, laterally spaced openings therein;
   means defining core mandrels extending at least into the openings of the front face of the housing;
   first extrusion means having a first outer diameter orifice within the housing for extruding a first rubbery material onto each of the core mandrels to form a relatively thin tubular core shape of such material;
   second extrusion means having a second outer diameter orifice greater than the first diameter within the housing at the outlet of the first extrusion means for extruding a relatively thicker layer of a second rubbery material onto each of the tubular core shapes as the core shapes are extruded to provide a relatively thicker tubular cover for each of the tubular core shapes; and
   means within the housing for individually adjusting the speed of each of the composite tubular shapes without significantly affecting the thicknesses of the tubular cover and the tubular core shape so that each of the tubular composite shapes is extruded at a uniform rate despite variations in the pressure of the second rubbery material at the respective second extrusion means thereof.

2. A multiple-cavity extrusion die according to claim 1 wherein the second rubbery material extrusion means includes a tubular cover die positioned within each of the openings in the front face, each of the cover dies having an inner annular edge forming a part of an annular extrusion die opening for the second rubbery material; and
   the speed adjusting means comprises means for mounting at least some of the cover dies in the face plate openings for adjustable axial movement, thereby adjusting the cover die extrusion opening.

3. A multiple-cavity extrusion die according to claim 2 wherein the inner annular edges of the cover dies are beveled with respect to the axis thereof.

4. A multiple-cavity extrusion die according to claim 3 wherein the beveled annular edges of the cover die have an angle in the range of 80° and 30° with respect to the axis of the cover dies.

5. A multiple-cavity extrusion die according to claim 3 wherein the beveled annular edges of the cover die have an angle of about 45° with respect to the axis of the cover dies.

6. A multiple-cavity extrusion die according to claim 4 wherein the second rubbery material extrusion means includes a plurality of tubular core dies having a conical outer surface whose angle with respect to the axis of the core dies is complementary to the angle of the beveled edges of the cover dies, the outer surface of the core dies forming with the beveled edges of the cover dies opposing portions of the extrusion orifice for the second rubbery material.

7. A multiple-cavity extrusion die according to claim 2 and further comprising means secured to the housing for adjusting the shape of the cover layer of at least some of the tubular shapes for concentricity as the tubular shapes are extruded.

8. A multiple-cavity extrusion die according to claim 7 wherein the concentricity adjusting means includes an annular plate mounted on at least some of the cover dies for facial adjustment with respect to the cover dies.

9. A multiple-cavity extrusion die according to claim 7 and further comprising means secured to the housing for adjusting at least some of the core mandrels for concentricity with respect to the respective cover dies.

10. A multiple-cavity extrusion die according to claim 1 and further comprising means secured to the housing for adjusting the shape of the cover layer of at least some of the tubular shapes for concentricity as the tubular shapes are extruded.

11. A multiple-cavity extrusion die according to claim 10 and further comprising means secured to the housing for adjusting at least some of the core mandrels for concentricity with respect to the first extrusion means.

12. A multiple-cavity extrusion die according to claim 1 and further comprising means secured to the housing for adjusting at least some of the core mandrels for concentricity with respect to the first extrusion means.

13. A multiple-cavity extrusion die according to claim 12 wherein the second rubbery material extrusion means include a plurality of cylindrical core dies having conical forward walls, the ends of which form with the core mandrels extrusion orifices for the first rubbery material; and said core mandrel adjusting means includes a plurality of pins which extend radially through and are threaded in the core dies in contact with the core mandrels.

14. A multiple-cavity extrusion die according to claim 12 wherein the core mandrel adjusting means extends radially of the housing and through the housing wall for adjustment of the core mandrel from exterior positions of the housing.

15. In an extrusion die for extruding tubular shapes wherein a housing includes a face plate and means defining two chambers for feeding two separate rubbery materials, the face plate includes at least one opening, means defining a die opening therein, a core mandrel extends at least into the face plate opening, a core die positioned concentrically around the core mandrel and having a leading edge which forms a first extrusion orifice with the core mandrel for a first rubbery material; and an exterior surface of the core die forms an extrusion orifice with a portion of the die opening means, the improvement which comprises:

said core die having a tubular body with an interior surface joining a frustro-conical front portion of substantially uniform wall thickness, said interior surface and the mandrel forming an annular space which is sufficiently large so that the leading edge only of the core die forms a first extrusion orifice with the core mandrel, whereby heat and pressure buildup at the first extrusion orifice is minimized due to the relative size of the annular space and the first extrusion orifice.

16. An extrusion die according to claim 15 wherein the die opening means is tubular in shape and has an annular beveled surface complementary to the leading external surface of the core die.

17. An extrusion die according to claim 16 wherein the angle of the core die conical wall is in the range of 30° to 80° with respect to the axis of the core mandrel.

18. An extrusion die according to claim 16 wherein the angle of the core die conical wall with respect to the axis of the core mandrel is about 45°.

19. In an extrusion die for extruding tubular shapes wherein a housing includes a face plate and means defining two chambers for feeding two separate rubbery materials to at least one opening in the face plate, means defining a die opening in the face plate; a core mandrel extends at least into the face plate opening, a core die positioned concentrically around the core mandrel and having a leading edge which forms a first extrusion orifice with a core mandrel for a first rubbery material; and an exterior surface of the core die forms an extrusion orifice with a portion of the die opening means, the improvement which comprises:

means coupled to said core mandrel and extending radially through the housing for adjusting the concentricity of the core mandrel with respect to the face plate from a location outside the housing;

the core mandrel adjusting means including a cylindrical adjusting wheel eccentrically mounting the core mandrels; means mounting the adjusting wheel and adjusting shank for rotation about a central axis of the wheel and parallel to the axis of the core mandrel; means mounting the adjusting shank for radial movement with respect to the housing; means extending to the outside of the housing for rotating the adjusting wheel with respect to the adjustable shank and independent of the adjusting shank; and means engaging the adjusting shank and extending to the outside of the housing for radially adjusting the adjusting shank with respect to the housing.

* * * * *